(12) United States Patent
Nakaminami et al.

(10) Patent No.: US 6,314,847 B1
(45) Date of Patent: Nov. 13, 2001

(54) MACHINE TOOL

(75) Inventors: Masamitsu Nakaminami; Hiroki Nagahara, both of Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/557,828

(22) Filed: Apr. 25, 2000

(30) Foreign Application Priority Data

Apr. 27, 1999 (JP) .................................................. 11-120077

(51) Int. Cl.[7] ....................................................... B23B 3/20
(52) U.S. Cl. .................................. 82/117; 82/122; 82/149
(58) Field of Search ............................. 82/117, 142, 149, 82/173, 122, 123

(56) References Cited

U.S. PATENT DOCUMENTS

| | | | |
|---|---|---|---|
| 4,409,869 | * 10/1983 | Berly | 82/117 |
| 4,831,906 | * 5/1989 | Sugimoto et al. | 82/118 |
| 5,117,552 | * 6/1992 | Babel | 483/36 |
| 5,429,020 | * 7/1995 | Hack et al. | 82/117 |

* cited by examiner

Primary Examiner—Henry Tsai
(74) Attorney, Agent, or Firm—Smith Patent Office

(57) ABSTRACT

A machine tool is provided where the support rigidity of the saddle is improved without increasing the height of the headstock. The machine tool includes a headstock situated on a fixed bed and a saddle having two different heights disposed on the fixed bed so as to be movable along a direction of an axis line of the headstock. A tool post is present on a column placed on the saddle so that the tool post is movable in a direction perpendicular to the axis line of the headstock. In this machine tool, the height of one portion of the saddle located toward the rear side of the tool is larger than the height of another portion of the saddle located toward the front side of the tool.

3 Claims, 4 Drawing Sheets

MACHINE TOOL

BACKGROUND OF THE INVENTION

1. Field of the Invention

The present invention relates to a machine tool in which a saddle is reciprocally movably disposed on a fixed bed. More particularly, the invention relates to the structure of the saddle.

2. Discussion of the Related Art

Among conventional machine tools there is, for example, a composite machining lathe in which one tool post is used for both lathe turning and rotating-tool machining. In this composite machining lathe, as shown in FIG. 4, on top of a fixed bed 200, a saddle 201 is disposed so as to be movable in the Z-axis direction (the perpendicular direction with respect to the plane of the drawing) by two linear guides 202. On top of the saddle 201, a column 204 is disposed so as to be movable by two linear guides 203 in a direction which is perpendicular to the Z-axis and in which the height increases with decreasing distance to the front (the direction indicated by arrow "a").

Further, on a front sloping surface 204a of the column 204, a tool post 205 is disposed so as to be movable in the X-axis direction and rotationally indexable to a specified angle. In addition, a headstock 206 is fixed to the fixed bed 200, and an automatic tool exchanger 207 is disposed on a sidewall of the column 204.

The saddle 201 is formed into a rectangular shape, as seen in a side view, with a height dimension (plate thickness) t unchanged from the front to the rear so that a line B interconnecting the linear guides 202 for the saddle and an axis line C of the linear guides 203 for the column are parallel to each other. Also, since heavy articles such as the column 204, the tool post 205 and the automatic tool exchanger 207 are mounted on the saddle 201, it is common practice to set the plate thickness t as large as possible to increase support.

However, increasing the plate thickness t of the saddle 201 as in the conventional lathe causes the height position of the tool post 205 to increase as well. As a result, the height h of the axis of the headstock 206 would become higher, which may deteriorate workability and machining precision.

SUMMARY OF THE INVENTION

In view of the above problems in machining lathes, an object of the invention is to provide a machine tool capable of improving the support rigidity for the saddle without increasing the height of the axis of the headstock.

In order to achieve the above and other objects, the present invention provides a machine tool comprising a fixed bed, a headstock disposed on the fixed bed, a saddle movably disposed on top of the fixed bed, a column disposed on the saddle, and a tool post disposed on the column so that the tool post is movable relative to the headstock. The saddle includes a first portion disposed closer to the headstock and a second portion disposed further from the headstock than the first portion and they are dimensioned so that a height of the second portion is larger than a height of the first portion.

In a further embodiment, the machine tool as described above includes a tool magazine, where one or more tools are mounted, is fitted to the portion of the saddle located toward the rear side of the tool.

According to the machine tool of this invention, since the saddle dimensions are set so that its rear-side height dimension is larger than its front-side height dimension, the saddle has increased rigidity to support such heavy articles as the column and the tool post without increasing the height dimension of the whole saddle. Therefore, the height of the axis of the tool post and the height of the axis of the headstock do not have to be increased. Thus deterioration in workability and machining precision can be prevented.

Also, in proportion to the degree to which the height dimension of the rear side portion of the saddle is increased, the area of the rear side wall can be enlarged, making it possible to attach, for example, an automatic tool exchanger to the rear side wall of the saddle having high rigidity. In such a case, the weight load of the column supporting the tool post can be reduced.

DETAILED DESCRIPTION OF THE PREFERRED EMBODIMENTS

An embodiment of the present invention is described below with reference to the accompanying drawings.

Figure 1:
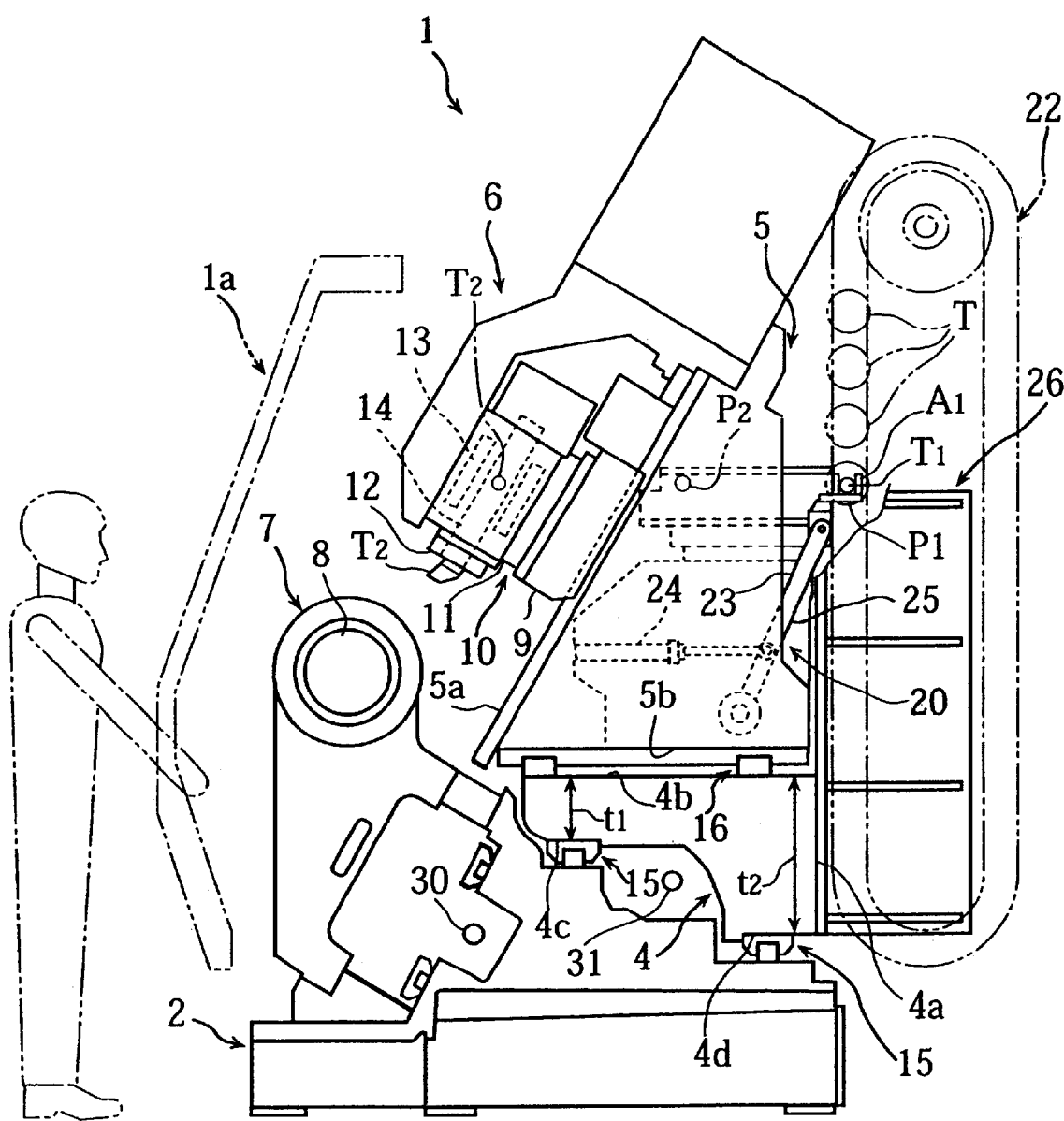
FIG. 1 is a right side view of a composite machining lathe according to a first embodiment of the present invention.
Figure 2:
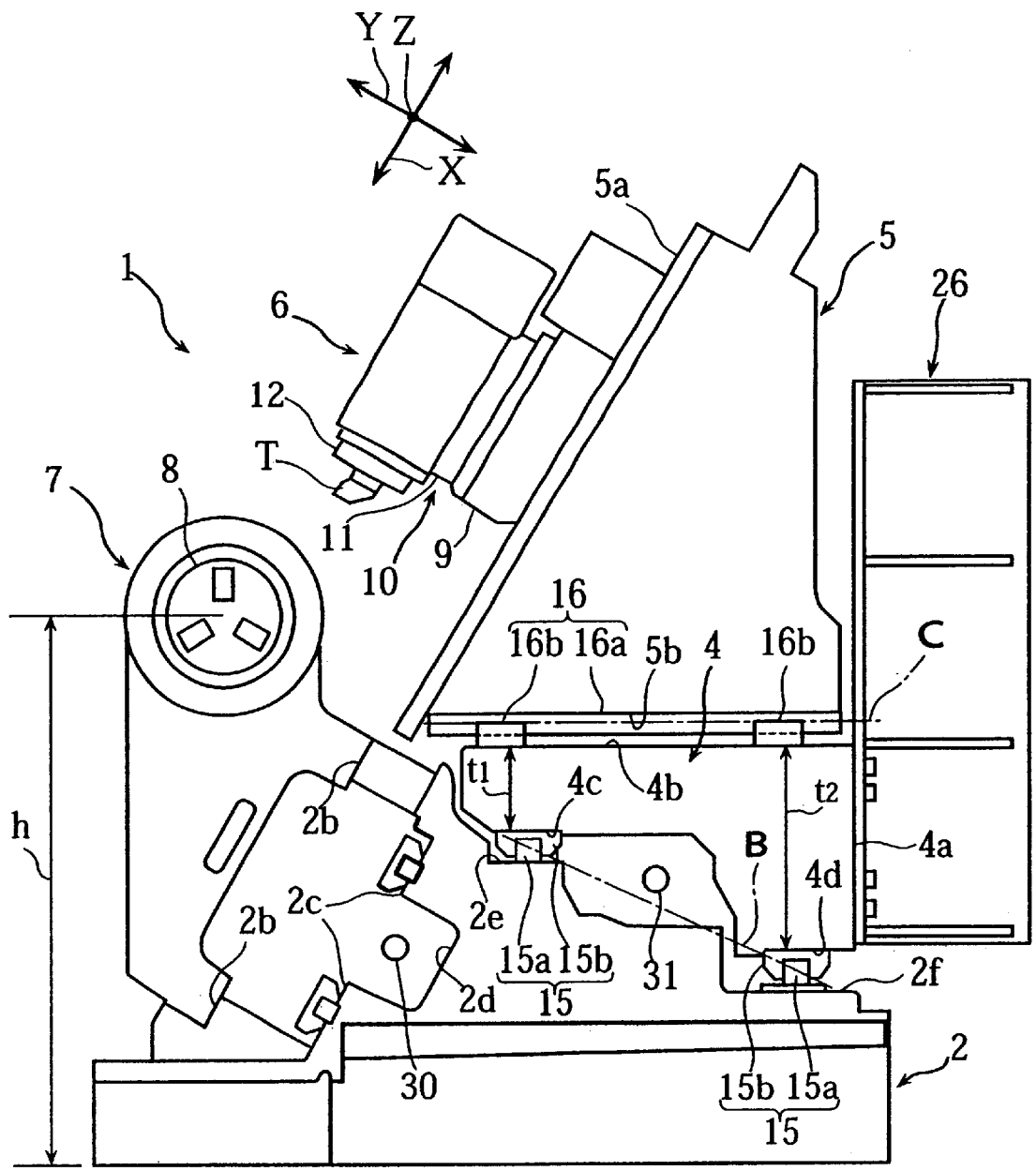
FIG. 2 is an enlarged right side view of the composite machining lathe.

FIGS. 1 and 2 are views for explaining a composite machining lathe according to an embodiment of the invention, both showing right side views of the composite machining lathe.

Referring to the figures, a composite machining lathe (machine tool) 1 is capable of performing both lathe turning and rotating-tool machining. Roughly referring to the construction of this composite machining lathe 1, a saddle 4 is disposed on top of a fixed bed 2 so as to be movable in the Z-axis by two linear guides 15. A column 5 is disposed on top of the saddle 4 so as to be movable in a horizontal direction perpendicular to the Z-axis by two linear guides 16. Moreover, a tool post 6 is disposed on the column 5 so as to be movable in the X-axis direction.

A headstock 7 is disposed and fixed at a left-side end portion of the fixed bed 2, as viewed from the front. A main spindle (not shown) equipped with a chuck 8 for gripping a workpiece is provided on the headstock 7, and a spindle motor 13 rotationally drives this main spindle. In addition, a door 1a, which opens and closes, is formed in a cover, not shown.

The tool post 6 includes a support base 9 disposed on a forwardly-declined sloping surface 5a of the column 5 so as to be movable in the X-axis direction, and a tool post body 11 is supported on the support base 9 so as to be turnable by means of a rotationally indexing device 10. It is preferable that the angle of the forwardly declined sloping surface 5a be roughly 60 degrees.

The tool post body 11 comprises a tool spindle 14 in which a tool T2 is removably fitted at its front portion, a tool spindle head 12 for rotatably supporting the tool spindle 14, and a spindle motor 13 which is disposed within the tool spindle head 12 and which rotationally drives the tool spindle 14.

The rotationally indexing device 10, for positioning and fixing the tool post body 11 in a specified indexing angular position, performs lathe turning and milling of diagonal holes or similar functions in a clamped state in the angular position.

The composite machining lathe 1 has an automatic tool exchanger 20. This automatic tool exchanger 20, to which tools T are removably fitted, comprises a longitudinally-longer elliptical tool magazine 22 for indexing and positioning a next-process tool T1 to a delivery position P1. The automatic tool exchanger 20 further comprises a transfer mechanism 25 having a transfer arm 23 and a drive cylinder 24. The transfer arm 23 transfers the next-process tool T1, which has been indexed to the delivery position P1, to a tool exchanging position P2. A drive cylinder 24 drives the transfer arm 23 into a horizontal swing within a plane perpendicular to the headstock 7. In addition, the tool exchanger 20 comprises a tool exchange mechanism (not shown) having an exchange arm and an exchange shaft for exchanging a process-completed tool T2 fitted to the tool spindle 14 for the next-process tool T1 placed in the tool exchanging position P2.

The tool magazine 22 is rotatably supported on a magazine support 26, and the magazine support 26 is fixedly bolted to a rear side wall 4a of the saddle 4. As this saddle 4 moves in the Z-axis direction, the tool magazine 22 also moves. This enables tool exchange irrespective of where the saddle 4 is positioned in the Z-axis direction.

The fixed bed 2 is formed into a generally triangular shape, as seen in the side view. In the front sloping portion of the fixed bed 2, headstock support seats 2b are formed and are parallel to the sloping surface 5a of the column 5. Linear guide support seats 2c are inwardly layered down between the two support seats 2b, and a recessed portion 2d is recessed between the two support seats 2c. A ball screw 30 for feeding is disposed within the recessed portion 2d.

Further, a front-side linear guide support seat 2e and a rear-side linear guide support seat 2f that is positioned at a place lower than the support seat 2e are formed on the rear sloping portion of the fixed bed 2 in a layer-down state. A ball screw 31 for feeding is disposed between these support seats 2e and 2f.

Rails 15a of the linear guides 15 are fixed at the linear guide support seats 2e, 2f, respectively, where a block 15b internally containing rollers is fitted to each of the rails 15a so as to be slidable in the Z-axis direction.

The saddle 4 generally has a hook shape, as viewed in the side view, having an upper-face column support seat 4b formed horizontally opposite to a lower face 5b of the column 5, and lower-face front-and-rear bed support seats 4c, 4d formed opposite to the front-side and rear-side linear guide support seats 2e, 2f of the fixed bed 2, respectively.

The blocks 15b of the linear guides 15 are fixed to the bed support seats 4c, 4d, respectively. Also, blocks 16b containing internal rollers of the linear guides 16 are fixed to the column support seat 4b, and a rail 16a fixed to the lower face 5b of the column 5 is movably fitted to the blocks 16b.

The saddle 4 is formed so that the plate thickness (height dimension) t2 of a rear side portion in the back-and-forth direction, as viewed from the front becomes larger than the plate thickness (height dimension) t1 of a front-side portion. In a more preferred embodiment, the rear-side plate thickness t2 is approximately double the front-side plate thickness t1. Thus, an axis line C of the linear guides 16 set on the column support seat 4b of the saddle 4 and a line B that interconnects the front-and-rear linear guides 15 disposed on the bed support seats 4c, 4d are nonparallel to each other so as to intersect in front of the saddle 4.

The operation and effects of the invention are described below.

According to this embodiment, since the rear-side plate thickness t2 of the saddle 4 is larger than the front-side plate thickness t1 of the saddle 4, the rigidity of the saddle 4 as a whole to support the heavy articles of the column 5 and the tool post 6 can be enhanced. In addition the machining precision can be improved, while the height of the axis of the tool post 6, as well as the height h of the axis of the headstock 7, remain generally the same as in conventional lathes.

Also, since the rear-side plate thickness t2 of the saddle 4 is larger than its front-side counterpart, the rigidity of the rear-side portion can be particularly enhanced so that the tool magazine 22 with a multiplicity of tools mounted thereon can be fitted to the rear side wall 4a. As a result, the column 5 is loaded only with enough weight to support the tool post 6, thus decreasing the rigidity necessary for the column 5.

Figure 3:
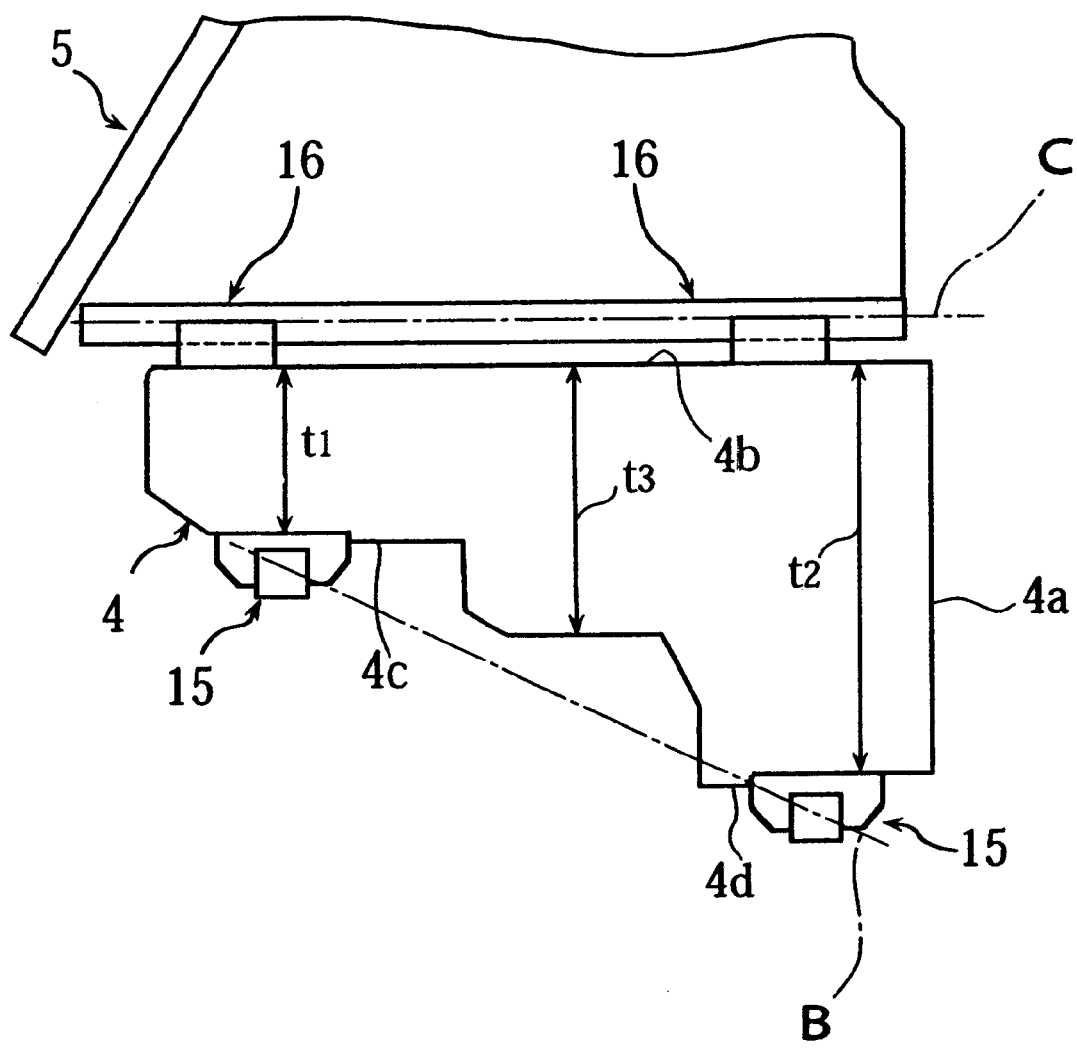
FIG. 3 is a side view showing a modification of the saddle shown in the first embodiment.
Figure 4:
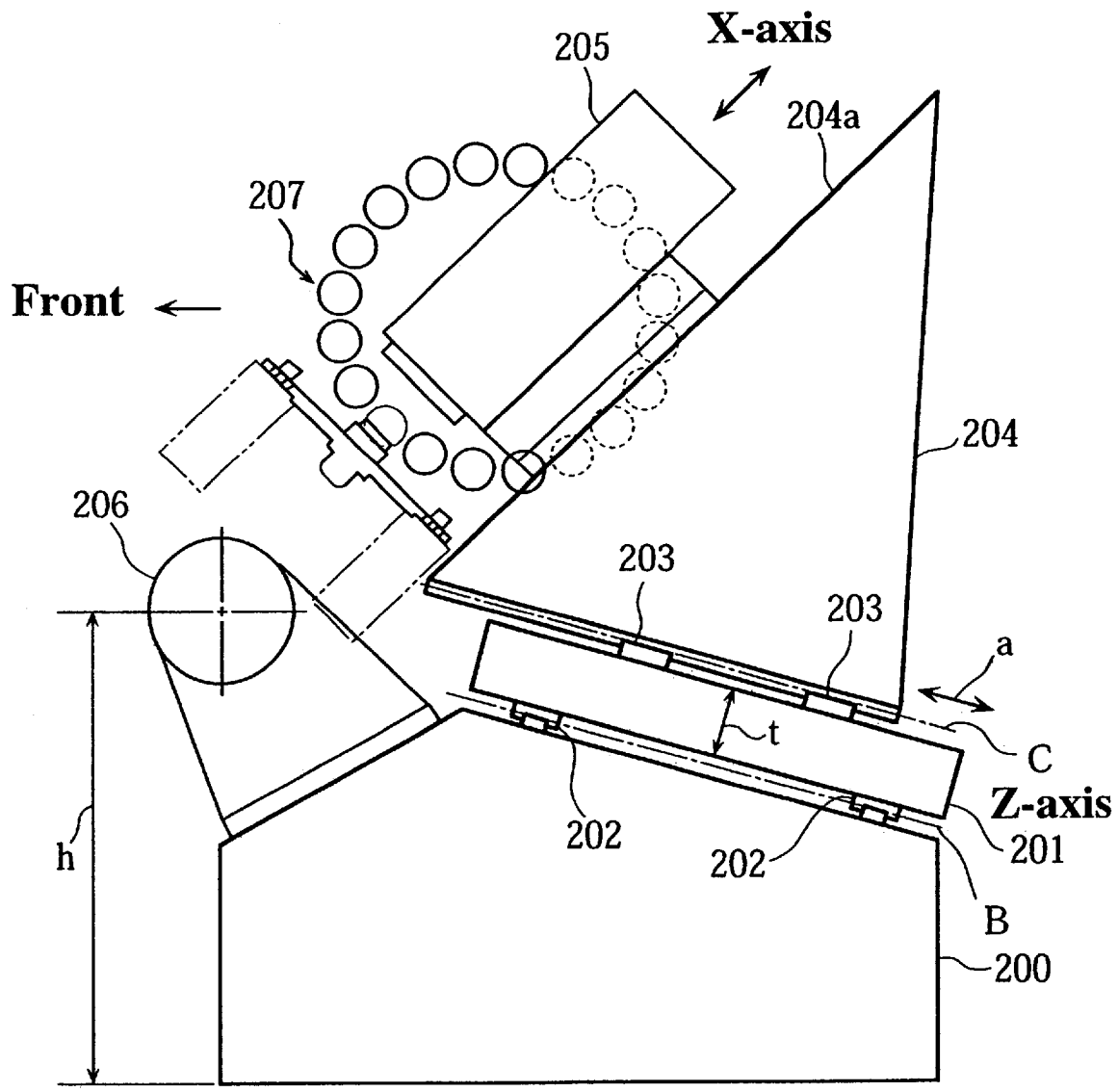
FIG. 4 is a schematic side view showing a conventional saddle structure.

In the above embodiment, the saddle 4 has a hook shape such that the rear-side plate thickness t2 is larger than the front-side plate thickness t1. However, the saddle of the present invention is not limited to this structure. For example, it is also possible to set an intermediate plate thickness t3 between the front-side plate thickness t1 and the rear-side plate thickness t2 so that t1<t3<t2 as shown in FIG. 3. Further, the bottom surface of the saddle may be inclined so as to be parallel to the line B that interconnects the front-and-rear linear guides 15. In such a case, the rigidity of the center portion of the saddle 4 can be enhanced, so that the support of the saddle as a whole can be further enhanced.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 11-120077 filed Apr. 27, 1999 is hereby incorporated by reference.

What is claimed is:

1. A machine tool comprising:
    a fixed bed;
    a headstock disposed on said fixed bed;
    a saddle movably disposed on top of said fixed bed, said saddle having an upper planar surface, a rear surface and a lower surface;

a column disposed on said saddle;

a tool post disposed on said column, said tool post being movable relative to said headstock, wherein said lower surface of said saddle includes a first horizontal portion disposed closer to said headstock and a second horizontal portion disposed further from said headstock than said first horizontal portion, said saddle being dimensioned so that a height between said upper planar surface and said second horizontal portion is larger than a height between said upper planar surface and said first horizontal portion; and wherein said machine tool further comprises a tool magazine adapted to receive a plurality of tools mounted to said rear surface of said saddle.

2. The machine tool as claimed in claim 1, wherein the height between said upper planar surface and said second horizontal portion of said saddle is twice the height between said upper planar surface and said first horizontal portion of said saddle.

3. The machine tool as claimed in claim 1, wherein said lower surface of said saddle further comprises an intermediate horizontal portion disposed between said first horizontal portion and said second horizontal portion of said saddle such that a height between said upper planar surface and said intermediate horizontal portion is less than the height between said upper planar surface and said second horizontal portion and greater than the height between said upper planar surface and the first horizontal portion.

* * * * *